United States Patent [19]
Yu

[11] Patent Number: 6,161,899
[45] Date of Patent: Dec. 19, 2000

[54] SEATBACK LATCH MECHANISM WITH LOCKING PIN

[75] Inventor: Shihong Yu, Troy, Mich.

[73] Assignee: Fisher Dynamics Corporation, St. Clair Shores, Mich.

[21] Appl. No.: 09/136,132

[22] Filed: Aug. 18, 1998

[51] Int. Cl.[7] ................................................. B60N 2/02
[52] U.S. Cl. ......................................................... 297/378.12
[58] Field of Search ........................ 297/378.12, 378.13, 297/378.14, 367, 378.1

[56] References Cited

U.S. PATENT DOCUMENTS

| | | | |
|---|---|---|---|
| 3,893,206 | 7/1975 | Pickles et al. | 297/367 X |
| 4,010,979 | 3/1977 | Fisher, III et al. | |
| 4,076,309 | 2/1978 | Chekirda et al. | 297/378.12 X |
| 4,103,970 | 8/1978 | Homier | 297/367 X |
| 4,219,234 | 8/1980 | Bell . | |
| 4,579,387 | 4/1986 | Bell . | |
| 4,634,182 | 1/1987 | Tanaka | 297/367 X |
| 4,645,263 | 2/1987 | Fourrey et al. | 297/367 X |
| 4,659,146 | 4/1987 | Janiaud | 297/367 |
| 4,687,252 | 8/1987 | Bell et al. | |
| 4,720,145 | 1/1988 | Bell . | |
| 4,733,912 | 3/1988 | Secord . | |
| 4,747,641 | 5/1988 | Bell . | |
| 4,789,205 | 12/1988 | Pipon et al. | 297/367 |
| 4,795,213 | 1/1989 | Bell . | |
| 4,822,100 | 4/1989 | Bell . | |
| 4,874,205 | 10/1989 | Arefinejad et al. | 297/367 X |
| 5,380,060 | 1/1995 | Sponsler et al. | 297/238 |
| 5,425,598 | 6/1995 | Sliney et al. | 297/378.12 X |
| 5,460,429 | 10/1995 | Whalen . | |
| 5,476,307 | 12/1995 | Whalen . | |
| 5,489,141 | 2/1996 | Strausbaugh et al. | 297/378.14 X |
| 5,492,389 | 2/1996 | McClintock et al. | 297/378.14 X |
| 5,590,932 | 1/1997 | Olivieri . | |
| 5,718,481 | 2/1998 | Robinson . | |
| 5,749,625 | 5/1998 | Robinson . | |
| 5,749,626 | 5/1998 | Yoshida | 297/367 |
| 5,938,286 | 8/1999 | Jones et al. | 297/378.14 X |
| 5,951,108 | 9/1999 | Bauer et al. | 297/378.12 |

FOREIGN PATENT DOCUMENTS

| | | | |
|---|---|---|---|
| 73767 | 9/1960 | France | 297/378.12 |
| 2353415 | 12/1977 | France | 297/378.12 |
| 1546104 | 5/1979 | United Kingdom | 297/378.14 |

*Primary Examiner*—Milton Nelson, Jr.
*Attorney, Agent, or Firm*—Harness, Dickey & Pierce, P.L.C.

[57] ABSTRACT

A seatback latch mechanism is provided having a quadrant that is adapted to be secured to support structure associated with a seat assembly or a motor vehicle. The quadrant includes a cam segment defining a dwell surface which extends between first and second locking surfaces. The seatback latch mechanism further includes a seatback support member supported for pivotal movement relative to the quadrant between an "upright" position and a "folded" position. The support member is adapted to support the seatback of a seat assembly for pivotal movement relative to the seat bottom. A locking pin is mounted to the seatback support member for selectively engaging one of the first or second locking surfaces, thereby defining the upright position and the folded position, respectively. The seatback latch mechanism further includes a release actuator for disengaging the locking pin from the first and second locking surfaces, whereby the locking pin engages the dwell surface to permit the seatback to be moved to the other of the upright and folded positions.

8 Claims, 6 Drawing Sheets

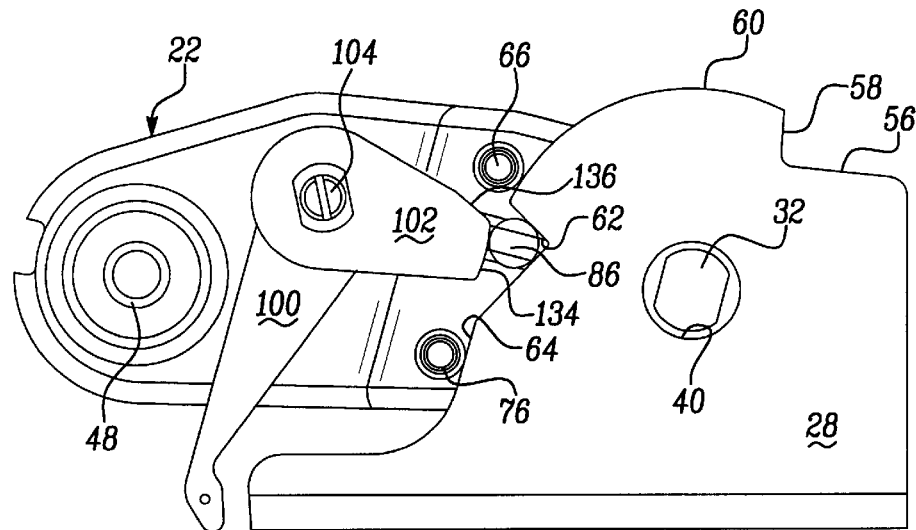
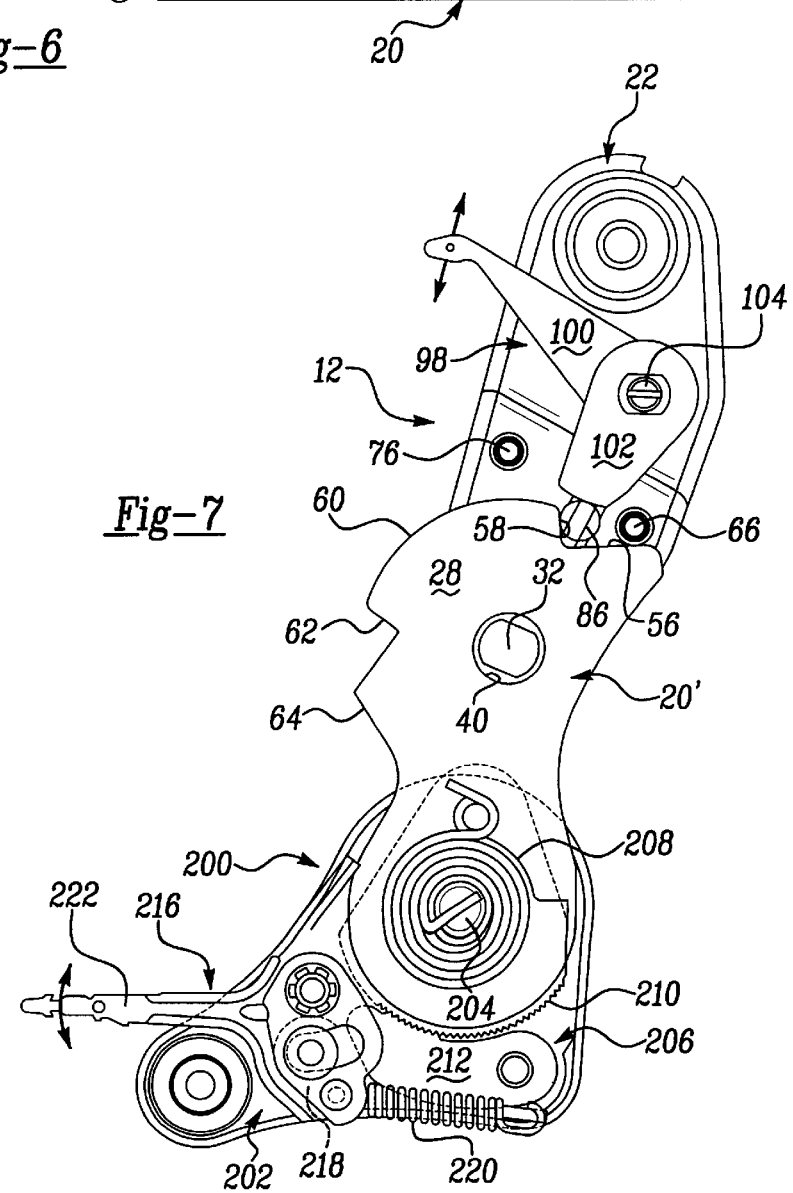

SEATBACK LATCH MECHANISM WITH LOCKING PIN

BACKGROUND OF THE INVENTION

The present invention relates generally to locking pivot mechanisms and, more particularly, to a seatback latch mechanism operable for locking a seatback in an upright position and a folded position.

Seat assemblies of the type used in motor vehicles are commonly equipped with locking pivot mechanisms which can be selectively actuated to permit angular adjustment of the seatback relative to the seat bottom, thereby providing added comfort and convenience for the seat occupant. Typically, these locking pivot mechanisms include a housing fixed to the seat bottom, a quadrant fixed to the seatback and which is supported from the housing for pivotal movement about a first pivot point, a lock pawl supported from the housing for pivotal movement about a second pivot point, and a release actuator for causing movement of the lock pawl between first and second positions. In its first position, teeth on the lock pawl engage teeth on the quadrant for preventing movement of the quadrant about the first pivot point, thereby releasably locking the seatback in a desired position. In contrast, movement of the lock pawl to its second position causes its teeth to disengage the teeth on the quadrant and permit angular movement of the seatback to a desired position. Typically, the release actuator includes a spring-biased cam for normally locating the locking pawl in its first position. In many seating applications, this type of locking pivot mechanism is used as a seat recliner to permit selective adjustment of the seatback between an upright position and a fully-reclined position.

Recently, however, with the increased popularity of pickup trucks, minivans, and sport-utility vehicles, there has been an interest in developing seat assemblies in which the seatback is capable of folding forward to a dumped position for providing improved accessibility to storage space or providing increased cargo area. In pickup trucks, the ability to fold the front seatbacks completely forward permits access to the rearward cab compartment. In mini-vans and sport-utility vehicles,the ability to fold the rear seatbacks completely forward enables the cargo space to be increased or ingress to be simplified. In known designs, the seat assembly is equipped with a seatback dump mechanisms which typically employs some variation of a pawl-type locking pivot mechanism. Although pawl type pivot mechanisms enable a seatback to be reclined to a substantially flat position, they may not enable the seatback to be folded completely forward to improve accessibility to storage space or provide increased cargo area. Furthermore, it should be appreciated that vehicular seats must be capable of withstanding extreme forward and rearward forces which result from belt loading caused during a collision incident. In pawl-type pivot mechanisms, these forces are transmitted to the pawl and the quadrant. As such, the cam must be designed to withstand these extreme forces, which increases the complexity and cost of the seatback dump mechanism.

Accordingly, a need exists in the relevant art to provide a seatback dump mechanism for latching the seatback in an upright position and a folded position so as to enable improved ingress and versatility of the vehicle. Furthermore, a need exists in the relevant art to provide a seatback dump mechanism capable of providing the folding function while maximizing structural integrity of the seatback dump mechanism and simultaneously minimizing the overall cost of the system.

SUMMARY OF THE INVENTION

In accordance with the broad teachings of this invention, a seatback latch mechanism having an advantageous construction is disclosed.

According to a preferred embodiment of the present invention, a seatback latch mechanism is provided having a quadrant adapted to be secured to support structure associated with a seat assembly or a motor vehicle. The quadrant includes a cam segment defining an arcuate dwell surface which extends between first and second locking surfaces. The seatback latch mechanism further includes a seatback support member supported for pivotal movement relative to the quadrant between an "upright" position and a "folded" position. The support member is adapted to support and pivotally couple the seatback of a seat assembly to the seat bottom. A locking pin is coupled to the seatback support member for selectively engaging one of the first or second locking surfaces, thereby defining the upright position and the folded position, respectively. The seatback latch mechanism still further includes a release actuator for disengaging the locking pin from the first and second locking surfaces, whereby the locking pin engages the dwell surface to permit the seatback to be moved to the other of the upright and folded positions.

According to the present invention, the seatback latch mechanism further includes first and second stop members. The first and second stop members prevent the seatback support member from pivoting beyond the upright and folded positions.

According to the present invention, the release actuator includes a handle pivotally mounted to the seatback support member, and a locking cam fixed to the handle for selectively urging the locking pin into engagement with the first or second locking surfaces. A biasing spring is operable for urging the locking cam into engagement with the locking pin and assists in maintaining engagement of locking pin with one of the locking surfaces.

Further areas of applicability of the present invention will become apparent from the detailed description provided hereinafter. It should be understood, however, that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 6 is a side elevational view of the seatback latch mechanism, similar to FIGS. 4 and 5, but showing the seatback latched in its folded position; and FIG. 7 is a side elevational view of the seatback latch mechanism mounted to a seat recliner mechanism for providing an independent seatback dump feature.

DETAILED DESCRIPTION OF THE PREFERRED EMBODIMENTS

Figure 1:
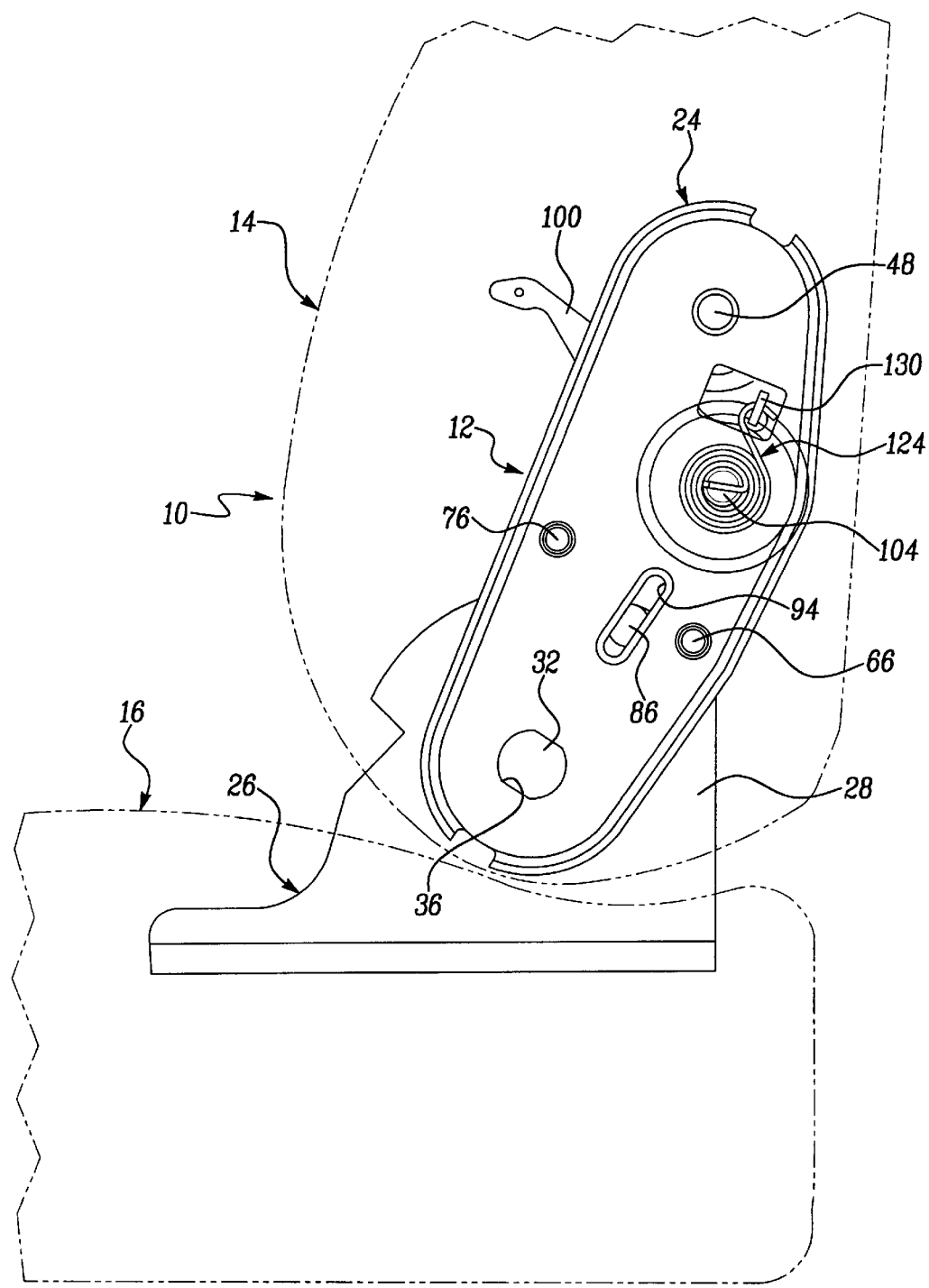
FIG. 1 is a side elevational view, with portions shown in phantom, of a vehicle seat assembly equipped with a seatback latch mechanism for latching the seatback in an upright position.

The following description of the preferred embodiment(s) is merely exemplary in nature and is in no way intended to limit the invention, its application, or uses.

Referring to the drawings, a vehicle seat assembly 10 incorporating a seatback latch mechanism 12 in accordance with the present invention is shown. In particular, seatback latch mechanism 12 is a locking pivot mechanism operable for supporting a seatback 14 for selective pivotal movement relative to a seat bottom 16 between a first or "upright" position and a second or "folded" position. Seat bottom 16 may be mounted to the floor pan or fender well of the vehicle; the frame structure of a bench-type seat; the seat pan in a stand-alone seat assembly; or any other equivalent vehicle-mounted support structure to which a seat bottom is fixed. Thus, seat assembly 10 is exemplary of the type conventionally used as a front seat in pickup trucks or the second and third row rear seats in sport-utility vehicles and minivans.

Seatback latch mechanism 12 is normally operable for latching seatback 14 in a desired use position (i.e., the upright position). Seatback latch mechanism 12 is further operable to permit seatback 14 to be released for movement from its upright position to a substantially horizontal position (i.e., its folded position) relative to seat bottom 16. Seatback latch mechanism 12 further functions to latch seatback 14 in its folded position. Depending on loading conditions, it is anticipated that seat assembly 10 may include either one or a pair of interconnected seatback latch mechanisms 12.

Figure 2:
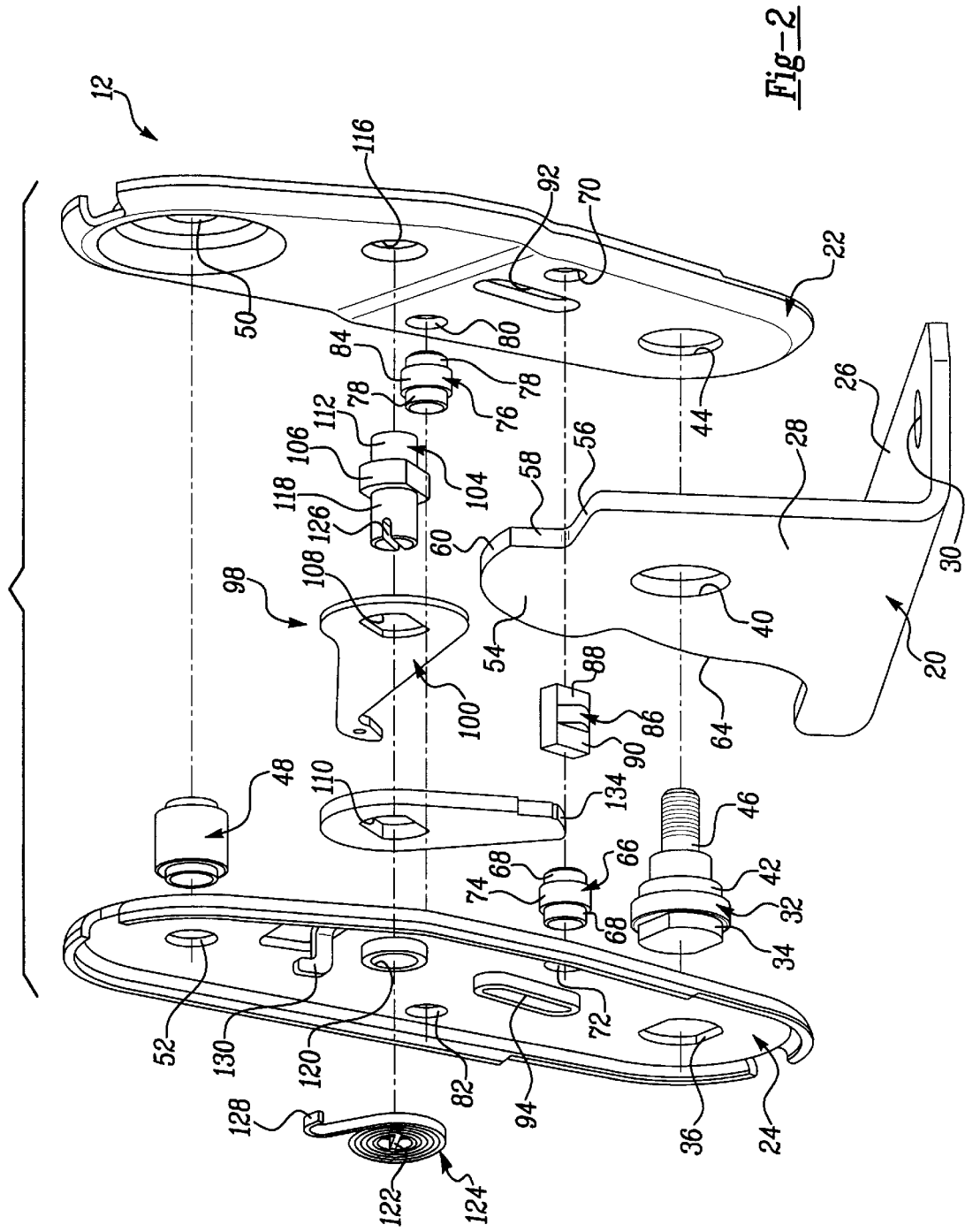
FIG. 2 is an exploded perspective view of the seatback latch mechanism.
Figure 3:
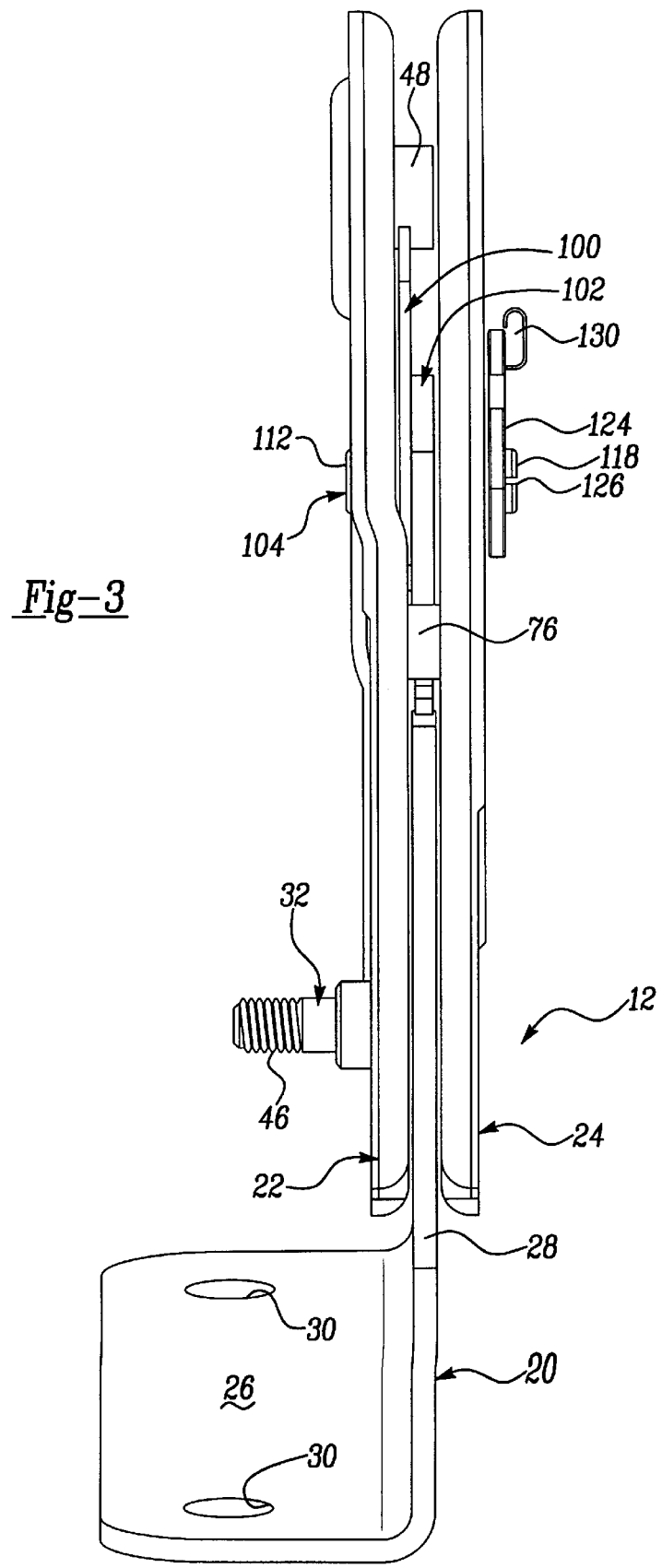
FIG. 3 is a perspective end view of the latch mechanism.

As best seen from FIGS. 2 and 3, seatback latch mechanism 12 includes a quadrant 20 and a pair of interconnected support plates 22 and 24. Quadrant 20 includes a base plate segment 26 and pivot plate segment 28. Base plate segment 26 is adapted to be rigidly mounted to suitable frame structure of seat assembly 10 and/or the vehicles floor plan such as by fasteners (not shown) mounted in apertures 30. A pivot fastener 32 is provided for mounting support plates 22 and 24 for synchronous pivotal movement relative to pivot plate segment 28 of quadrant 20. In particular, a drive segment 34 of pivot fastener 32 is retained in a similarly-shaped aperture 36 formed in outer support plate 24, a first cylindrical segment 38 of pivot fastener 32 is rotatably supported in a journal aperture 40 formed in pivot plate segment 28 of quadrant 20, and a second cylindrical segment 42 of pivot fastener 32 is retained in an aperture 44 formed in inner support plate 22. A Threaded stud segment 46 extends from pivot fastener 32 and is adapted to permit a suitable frame portion of seatback 14 to be mounted thereto for pivotal movement with support plates 22 and 24. In addition to other components hereinafter described, a hollow mounting sleeve 48 extends between aligned apertures 50 and 52 formed in support plates 22 and 24 to permit another fastener to pass therethrough for connecting the uppermost portion of support plates 22 and 24 to seatback 14.

Figure 4:
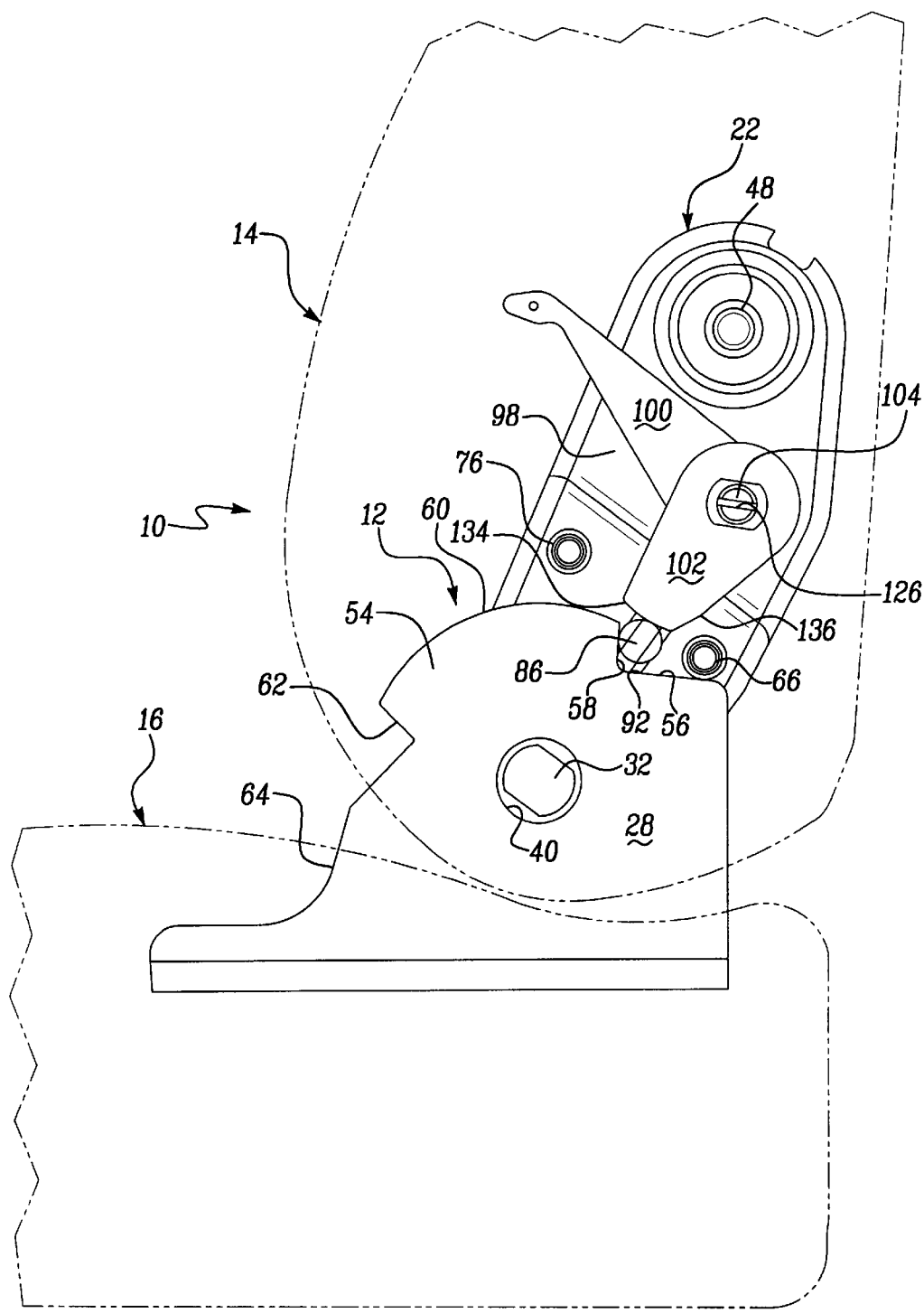
FIG. 4 is a side elevational view of the seatback latch mechanism shown in FIG. 1 with some components removed for greater clarity with the seatback latched in its upright position.

Pivot plate segment 28 of quadrant 20 includes a raised cam segment 54 having an edge profile sequentially defining a first stop surface 56, a first lock surface 58, a dwell surface 60, a second lock surface 62, and a second stop surface 64. A first stop pin 66 has end segments 68 retained in aligned apertures 70 and 72 formed respectively in support plates 22 and 24 and a central cylindrical segment 74 which is adapted to engage first stop surface 56 when seatback 14 is in its upright position, as shown in FIGS. 1 and 4. Similarly, a second stop pin 76 has end segments 78 retained in aligned apertures 80 and 82 formed respectively in support plates 22 and 24 and a central cylindrical segment 84 which is adapted to engage second stop surface 64 when seatback 14 is in its folded position, as shown in FIG. 6.

To provide means for releasably latching seatback 14 in both of its upright and folded positions, seatback latch mechanism 12 includes a lock pin 86 having end segments defining rectangular guide lugs 88 and 90 that are retained for sliding non-rotational movement in a pair of aligned guide slots 92 and 94 respectively formed in support plates 22 and 24. Lock pin 86 further includes a central cylindrical segment 96 that is adapted to engage one of first lock surface 58, dwell surface 60, and second lock surface 62. A spring-biased release actuator 98 is provided for maintaining engagement of cylindrical segment 96 of lock pin 86 with first lock surface 58 to releasably latch seatback 14 in its upright position. Release actuator 98 is further operable for maintaining engagement of cylindrical segment 96 of lock pin 86 with second lock surface 62 to releasably latch seatback 14 in its folded position. Finally, release actuator 98 can be selectively manipulated to release cylindrical segment 96 of lock pin 86 from latched engagement with first and second lock surfaces 58 and 62 for sliding movement along dwell surface 60 of cam segment 54 in response to movement of seatback 14 between its upright and folded positions.

Release actuator 98 includes a release handle 100 and a lock cam 102, both of which are fixed to a pivot pin 104 which, in turn, is rotatably supported between support plates 22 and 24. In particular, pivot pin 104 has a non-circular drive lug 106 extending through similarly-shaped apertures 108 and 110 formed respectively in handle 100 and lock cam 102. A first cylindrical end segment 112 of pivot pin 104 is journally supported in an aperture 116 formed in support plate 22 while an elongated second cylindrical end segment 118 of pivot pin 104 is journally supported in an aperture 120 formed in support plate 24. An inner end 122 of a biasing spring 124 is fixed to a groove 126 in second end segment 118 of pivot pin 104 and an outer end 128 of biasing spring 124 is hooked on a retainer flange 130 extending from support plate 24. Biasing spring 124 is arranged to continuously exert a rotational biasing force on pivot pin 104 for urging handle 100 and lock cam 102 to rotate in a first (i.e., counterclockwise in the drawings) direction.

Referring primarily to FIGS. 1 and 4, seatback latch mechanism 12 is shown operating to latch seatback 14 in its upright position. To provide this locking function, biasing spring 124 biases handle 100 to a non-actuated position and lock cam 102 to a first position whereat an arcuate cam surface 134 on the end of lock cam 102 acts on cylindrical segment 96 of lock pin 86 for loading lock pin 86 against first lock surface 58. With lock cam 102 in its first position, lock pin 86 engages first lock surface 58 for preventing forward movement of seatback 14 while first stop pin 66 abuts first stop surface 56 for preventing rearward movement of seatback 14. This latching arrangement also functions to prevent chucking of seatback 14 relative to seat bottom 16 with seatback 14 latched in its upright position.

Figure 5:
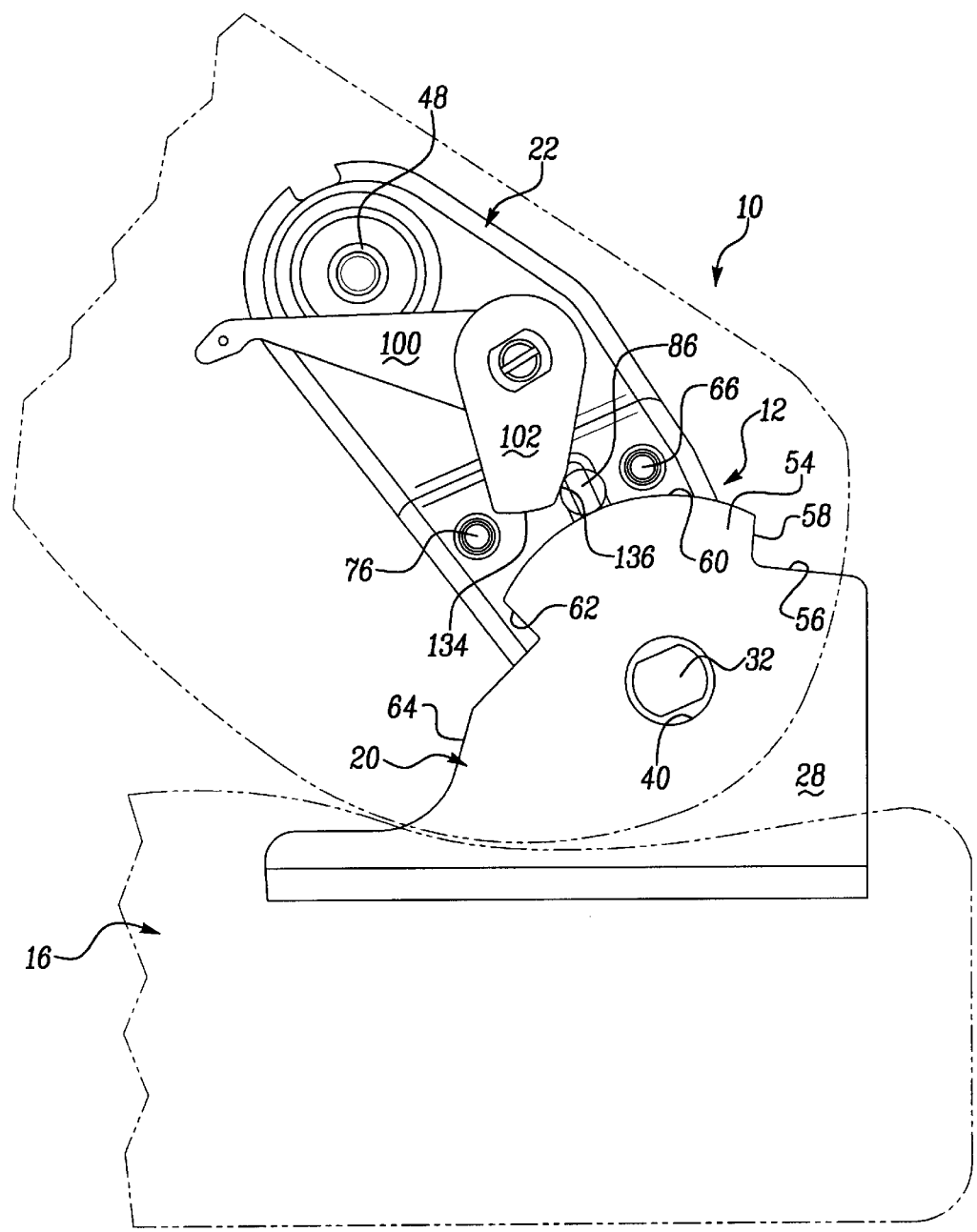
FIG. 5 is a side elevational view of the seatback latch mechanism, similar to FIG. 4, but showing the seatback in a disengaged intermediate position between its upright and folded positions.

When it is desired to release seatback 14 for movement to its folded position, handle 100 is rotated in a second direction (i.e., clockwise) to an actuated position for rotating lock cam 102 to a second position, in opposition to biasing of spring 124, such that cam surface 134 of lock cam 102 is released from engagement with cylindrical segment 96 of lock pin 86. With handle 100 initially held in its actuated position, subsequent rotation of support plates 22 and 24 about pivot fastener 32 cause lock pin 86 to initially move upwardly in guide slots 92, 94 until cylindrical segment 96 of lock pin 86 is in engagement with dwell surface 60 and a trailing edge surface 136 of lock cam 102, as shown in FIG. 5. Specifically, the angular relationship of guide slots 92 and 94 relative to first lock surface 58 facilitates the ramping movement of cylindrical segment 96 of lock pin 86 up first lock surface 58 and onto dwell surface 60. With cylindrical segment 96 of lock pin 86 sliding on dwell surface 60, lock cam 102 is held in its second position and handle 100 is held in its activated position in opposition to the biasing of biasing spring 124. Once seatback 14 is in its folded position, cylindrical segment 96 of lock pin 86 disengages dwell surface 60 and is aligned adjacent to second lock surface 62. Immediately thereafter, biasing spring 124 urges handle 100 to return to rotate to its non-actuated position and lock cam 102 to rotate back to its first position whereat cam surface 134 re-engages cylindrical segment 96 of lock pin 86 for loading lock pin 86 against second lock surface 62 and latching seatback in its folded position, as shown in FIG. 6. As is also shown, second stop pin 76 engages second stop surface 64 to prevent excessive forward movement of seatback 14 past its folded position. To return seatback 14 from its folded position to its upright position, handle 100 must again be rotated to its actuated position for moving lock cam 102 to its second position for disengaging cam surface 134 of lock cam 102 from cylindrical segment 96 of lock pin 86. The angular relationship between second lock surface 62 and guide slots 92 and 94 permit lock pin 86 to ramp up second lock surface 62 and onto dwell surface 60 in response to initial movement of support plates 22, 24 relative to quadrant 20.

According to the novel configuration of the present invention, lock cam 102 is adapted to selectively engage locking pin 86 with either first lock surface 58 or second lock surface 62. This unique arrangement permits forward and rearward loading forces to be transmitted from support plates 22 and 24 through either lock pin 86 or stop pins 66 and 76 directly to quadrant 20. As such, minimal forces are transmitted from lock pin 86 to lock cam 102 and pivot pin 104, thereby allowing lock cam 102 and pivot pin 104 to be smaller and lighter than conventional components. Furthermore, the novel configuration of the present invention, compared to the pivotable pawl style design, allows the pawl component to be eliminated, thereby reducing the cost of the system.

The application for seatback latch mechanism 12 shown in FIGS. 1 through 6 can also be used in association with fold-out components of seat assemblies such as, for example, trays, consoles and built-in child seats, for latching such components in both a stowed position and a deployed position. Moreover, seatback latch mechanism 12 can, as shown in FIG. 7, be used as a seatback dump mechanism 12' which is incorporated into a seat recliner 200. In this application, seat recliner 200 includes a mounting plate 202 adapted to be fixed to frame structure of seat bottom 16, and a modified quadrant 20' pivotally mounted to mounting plate 202 for rotation about a hinge pin 204. A recliner latch assembly 206 includes a sector plate 208 fixed for rotation with quadrant 20' and having teeth 210 formed thereon, and a lock pawl 212 supported from mounting plate 202 for pivotal movement between a locked position and a released position. In its locked position, teeth 214 on lock pawl 212 engage teeth 210 on sector plate 208 for latching seatback 14 in a desired use position. In its released position, teeth 214 are disengaged from teeth 210 on sector plate 208 for permitting angular movement of seatback 14 so as to adjust the use position of seatback 14 between an upright position and a fully-reclined position. A recline operator 216 is provided for normally locating and holding lock pawl 212 in its locked position. Recline operator 216 includes a cam 218 pivotably mounted to mounting plate 202 and a biasing spring 220 for normally biasing cam 218 into engagement with lock pawl 212 for holding lock pawl 212 in its locked position. A handle 222 can be selectively manipulated by the seat occupant to move cam 218 in opposition to biasing spring 220 for permitting lock pawl 212 to move from its locked position to its released position when it is desired to adjust the seatback use position.

Seatback dump mechanism 12' is normally operable with lock pin 86 held against first lock surface 58. However, when it is desired to dump seatback 14 to its forward dumped position, release actuator 98 is actuated by rotating handle 100 to its actuated position which, as previously mentioned, permits support plates 22 and 24 to rotate about pivot pin 32 from the upright position shown to its folded position, whereby seatback 14 moves from the use position established by seat recliner 200 to its forward dumped position. Seatback dump mechanism 12' prevents return of seatback 14 to its last use position until handle 100 is again rotated to release lock pin 86 from engagement with second lock surface 62. As such, seatback dump mechanism 12' works in conjunction with seat recliner 200 to permit independent adjustment of the seatback use position via actuation of recline operator 216 and independent folding of seatback 14 via actuation of release actuator 98. Due to such independent operation, seatback dump mechanism 12' acts as a "memory" dump mechanism since seatback 14 is returned to its last use position which is dictated by the angular position of quadrant 20' relative mounting plate 202.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat assembly comprising:

a seat bottom;

a seatback; and a seatback latch mechanism supporting said seatback for pivotal movement relative to said seat bottom between an upright position and a folded position, said seatback latch mechanism including a stationary quadrant having a cam segment defining first and second locking surfaces, a support member fixed to said seatback and pivotably coupled to said quadrant, a locking pin supported from said support member and engageable with said first locking surface when said seatback is in its upright position and with said second locking surface when said seatback is in its folded position, a lock cam having a cam surface said lock cam supported from said support member for movement between a first position whereat said cam surface urges said locking pin against one of said first and second locking surfaces and a second position whereat said cam surface is released from engagement with said locking pin, a spring operatively coupled to said lock cam to bias said lock cam to its first position, and a released handle coupled to said lock cam for moving said lock cam from its first position to its second position when it is desired to move said seatback between its upright and folded positions.

2. The seat assembly of claim 1 further comprising a first stop member mounted to said support member and adapted to engage said quadrant when said seatback is in its upright position to prevent rearward pivotal movement of said seatback beyond its upright position.

3. The seat assembly of claim 2 further comprising a second stop member mounted to said support member and adapted to engage said quadrant when said seatback is in its folded position to prevent forward pivotal movement of said seatback beyond its folded position.

4. The seat assembly of claim 1 wherein said quadrant is fixed to said seat bottom.

5. The seat assembly of claim 1 wherein said cam segment of said quadrant has an edge profile sequentially defining a first stop surface, said first locking surface, a dwell surface, said second locking surface and a second stop surface, said locking pin is adapted to slide along said dwell surface when said seatback is released for movement between its upright and folded positions, and further comprising a first stop pin fixed to said support member which engages said first stop surface when said locking pin engages said first locking surface, and a second stop pin fixed to said support member which engages said second stop surface when said locking pin engages said second locking surface.

6. The seat assembly of claim 1 wherein said locking pin is retained for sliding movement in a guide slot formed in said support member such that movement of said lock cam to its second position permits said locking pin to disengage one of said first and second locking surfaces and slide on an intermediate dwell surface in response to movement of said seatback between its upright and folded positions.

7. The seat assembly of claim 1 further comprising a seat recliner having said quadrant pivotably mounted to a stationary mounting plate and a recline latch assembly normally operable for latching said quadrant to said mounting plate to prevent reclining movement of said seatback and which can be selectively activated to release said quadrant for pivotal movement relative to said mounting plate and permit reclining movement of said seatback.

8. The seat assembly of claim 1 wherein said locking pin moves out of engagement with one of said first and second locking surfaces in response to movement of said seatback from one of said upright and folded positions.

* * * * *